United States Patent
Caldwell et al.

(10) Patent No.: US 10,185,439 B2
(45) Date of Patent: *Jan. 22, 2019

(54) TIME DOMAIN DIFFERENTIAL TECHNIQUES TO CHARACTERIZE VARIOUS STIMULI

(71) Applicant: AlSentis, LLC, Holland, MI (US)

(72) Inventors: David W. Caldwell, Holland, MI (US); Robert G. Bos, Grand Haven, MI (US); Stefan G. Kurek, Grand Rapids, MI (US)

(73) Assignee: Alsentis, LLC, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,238

(22) Filed: Dec. 21, 2017

(65) Prior Publication Data

US 2018/0136780 A1    May 17, 2018

(51) Int. Cl.
| | |
|---|---|
| *G06F 3/041* | (2006.01) |
| *G06F 3/042* | (2006.01) |
| *G06F 3/044* | (2006.01) |
| *G06K 9/00* | (2006.01) |

(52) U.S. Cl.
CPC .......... *G06F 3/0416* (2013.01); *G06F 3/044* (2013.01); *G06F 3/0421* (2013.01); *G06K 9/0002* (2013.01); *G06K 9/0004* (2013.01); *G06F 2203/04106* (2013.01)

(58) Field of Classification Search
CPC combination set(s) only.
See application file for complete search history.

(56) References Cited

U.S. PATENT DOCUMENTS

| | | |
|---|---|---|
| 5,594,222 A | 1/1997 | Caldwell |
| 5,760,715 A | 6/1998 | Senk et al. |
| 6,310,611 B1 | 10/2001 | Caldwell |
| 6,320,282 B1 | 11/2001 | Caldwell |
| 6,466,036 B1 | 10/2002 | Philipp |
| 6,713,897 B2 | 3/2004 | Caldwell |
| 7,009,663 B2 | 3/2006 | Abileah et al. |
| 7,030,513 B2 | 4/2006 | Caldwell |
| 7,218,498 B2 | 5/2007 | Caldwell |
| 7,746,325 B2 | 6/2010 | Roberts |
| 7,920,134 B2 | 4/2011 | Krah |
| 8,111,243 B2 | 2/2012 | Peng et al. |
| 8,144,132 B2 | 3/2012 | Chen et al. |
| 8,169,416 B2 | 5/2012 | Han |
| 9,851,834 B2 | 12/2017 | Caldwell et al. |

(Continued)

FOREIGN PATENT DOCUMENTS

| | | |
|---|---|---|
| EP | 1881605 A1 | 1/2008 |
| WO | WO-2006115946 A2 | 11/2006 |
| WO | WO-2010111362 A1 | 9/2010 |

*Primary Examiner* — Jennifer Mehmood
*Assistant Examiner* — Deeprose Subedi
(74) *Attorney, Agent, or Firm* — Lorenz & Kopf, LLP

(57) ABSTRACT

A method for determining a stimulus is provided. The method includes determining a touch condition based on the rate of change of electrode capacitance, measuring a characteristic of the electrode capacitance in response to the touch condition being met, and evaluating the measured characteristic to determine the touch stimulus. The method can improve the ability to determine a touch stimulus over existing methods, including the ability to determine fingerprint and handprint biometrics, for example.

14 Claims, 3 Drawing Sheets

(56) References Cited

U.S. PATENT DOCUMENTS

| | | |
|---|---|---|
| 2003/0063073 A1 | 4/2003 | Geaghan et al. |
| 2003/0067451 A1 | 4/2003 | Tagg et al. |
| 2003/0206162 A1 | 11/2003 | Roberts |
| 2003/0215976 A1 | 11/2003 | Chou et al. |
| 2005/0253596 A1 | 11/2005 | Kitano et al. |
| 2006/0267953 A1 | 11/2006 | Peterson et al. |
| 2007/0229466 A1 | 10/2007 | Peng et al. |
| 2008/0122798 A1 | 5/2008 | Koshiyama et al. |
| 2009/0060296 A1 | 3/2009 | Mainguet |
| 2010/0117981 A1 | 5/2010 | Chen et al. |
| 2010/0295813 A1 | 11/2010 | Kent |
| 2011/0043227 A1 | 2/2011 | Pance et al. |
| 2011/0084937 A1 | 4/2011 | Chang et al. |
| 2011/0254672 A1 | 10/2011 | Ciesla et al. |
| 2011/0279406 A1 | 11/2011 | Kawaguchi et al. |
| 2011/0279408 A1 | 11/2011 | Urano et al. |
| 2012/0001859 A1 | 1/2012 | Kim et al. |
| 2012/0062516 A1 | 3/2012 | Chen et al. |
| 2012/0068760 A1* | 3/2012 | Caldwell ............... G06F 3/0418 327/517 |
| 2012/0068957 A1 | 3/2012 | Puskarich et al. |
| 2012/0075239 A1 | 3/2012 | Azumi et al. |
| 2012/0092324 A1 | 4/2012 | Buchan et al. |
| 2013/0050126 A1 | 2/2013 | Kimura et al. |
| 2013/0129163 A1 | 5/2013 | Chung et al. |
| 2013/0279769 A1* | 10/2013 | Benkley, III ....... G06K 9/00013 382/124 |
| 2014/0133714 A1 | 5/2014 | Ivanov et al. |
| 2015/0042595 A1 | 2/2015 | Setlak et al. |

* cited by examiner

TIME DOMAIN DIFFERENTIAL TECHNIQUES TO CHARACTERIZE VARIOUS STIMULI

This application is a continuation of U.S. Ser. No. 14/482,099, filed Sep. 10, 2014 (now U.S. Pat. No. 9,851,834), which claims the benefit of U.S. provisional application, Ser. No. 61/875,961, filed Sep. 10, 2013. which is hereby incorporated herein by reference in its entirety. The disclosures of the above applications are incorporated herein by reference.

BACKGROUND OF THE INVENTION

The present invention relates to methods for characterizing various stimuli, for example touch inputs, using time domain differential sensing techniques.

Touch inputs are widely used as an input methodology. For example, touch inputs are used in conjunction with appliances, tablets, and smartphones. Touch inputs are also used in conjunction with fingerprint sensors. For example, fingerprint swipe sensors can use conventional capacitive sensing techniques to convert a touch swipe into a two-dimensional image of a fingerprint. Handprint sensors are an extension of this technology, and can generate a pixelated image where each pixel includes a greyscale value proportional to the distance from the skin.

Touch inputs can be determined based on a capacitive output of an electrode. According to one known method, the value of the capacitive output is used to determine the presence of a touch input on a substrate, the location of a touch input on a two-dimensional panel, or the individual peaks and valleys in a fingerprint. However, the capacitive output is generally compared against a reference value, which in practice is an approximation. The reference value can lead to false touch inputs or the failure to register actual touch inputs depending on manufacturing tolerances, environmental changes, and other considerations.

SUMMARY OF THE INVENTION

Methods for determining a stimulus are provided. The methods generally include detecting a touch condition based on the rate of change of electrode capacitance and evaluating the touch condition after its detection. The methods can conserve computing resources by deferring the evaluation of the touch condition until after the touch condition has been detected, while also providing additional data, in particular rate of change data, for evaluating the touch condition.

According to one embodiment, a method includes determining a touch condition based on the rate of change of electrode capacitance, measuring a characteristic of the electrode capacitance in response to the touch condition being met, and evaluating the measured characteristic to determine the touch stimulus. The method is adapted for use with capacitive sensors, including touch screens, touch pads, fingerprint sensors, and handprint sensor, and can be further modified for use with optical sensors.

In one embodiment, determining a touch condition includes determining the rate of change of electrode capacitance. The rate of change of electrode capacitance can decrease, slowing to nearly zero, as an object comes to rest against a touch surface. As the rate of change of electrode capacitance falls below a threshold value, a touch condition is registered. The touch condition can correspond to the object coming to rest, or very nearly to rest, for example the placement and flattening of a fingertip against a touch substrate. The touch condition can also correspond to placement of a finger against a fingerprint sensor for the subsequent evaluation of a fingerprint.

In one embodiment, measuring a characteristic of the capacitance includes measuring the instantaneous capacitance, the rate of change of capacitance, or both the instantaneous capacitance and the rate of change of capacitance. This step can include detecting individual ridges and valleys in a fingertip, which is optionally performed only after the touch condition is met, thereby conserving computing resources. Detecting individual ridges and valleys can include sampling a plurality of capacitors positioned beneath the fingertip, or sampling a single capacitive sensor as a fingertip slides over a capacitive sensor. Measuring a characteristic of the electrode capacitance can also include measuring the rate of change of electrode capacitance from prior to, coincident with, or after a touch condition is registered.

In one embodiment, evaluating the measured characteristic includes a comparison with data stored to computer readable memory. For example, the measured characteristic can include a rate of change of electrode capacitance, and the data stored to computer readable memory can include a look-up table including various stimuli and their corresponding rate of change of electrode capacitance. Also by example, the measured characteristic can include an image of a fingerprint, and the data stored to memory can include previously collected biometric data corresponding to a plurality of different fingerprints.

The present embodiments can be very valuable when coupled with conventional fingerprint sensing techniques. Using a variety of techniques, fingerprint sensing is meant to measure fingerprints that are unique to individuals. Therefore a fingerprint measured should correspond to an individual and there should be one unique fingerprint measurement per person. In order to measure a fingerprint, many techniques require that the finger be pressed to a surface so that sensing circuitry can measure the fingerprint. If the finger is above the surface or perhaps lightly touching the measurement surface, then the sensing circuitry may sense inconsistent inputs. If placement of a finger against the surface is first detected and then the data for fingerprint sensing is obtained, data obtained from the sensing circuitry can be more consistent for comparing to reference data. The reference data itself may be more consistent and reliable if the same sensing of touch first and the fingerprint sensing data is then taken as well.

These and other features and advantages of the present invention will become apparent from the following description of the invention, when viewed in accordance with the accompanying drawings and appended claims.

DESCRIPTION OF THE CURRENT EMBODIMENTS

The current embodiments generally relate to methods for determining various stimuli. The methods generally include detecting a touch condition based on the rate of change of electrode capacitance and evaluating the touch condition after its detection. The methods can conserve computing resources by deferring the evaluation of the touch condition until after the touch condition has been detected, while also providing additional data, in particular rate of change data and touch stimulus level, for evaluating the touch condition. The methods are adapted for use with a wide variety of capacitive sensors, including touch screens, touch pads, fingerprint sensors, and handprint sensors, and are equally applicable to optical sensors, including optical fingerprint sensors.

The methods of the present invention can be performed by the sensing circuits set forth in WIPO Publication WO2010/111362 to Caldwell et al entitled "Apparatus and Method for Determining a Touch Input," and WIPO Publication WO2013/163496 to Caldwell et al entitled "Apparatus and Method for Determining a Stimulus, Including a Touch Input and a Stylus Input," the disclosures of which are incorporated by reference in their entirety. Further by example, the embodiments may be implemented in combination with the electrode structure at FIG. 22 of WO2013/163496. Other sensing circuits and other electrodes can be used as desired.

Figure 1:
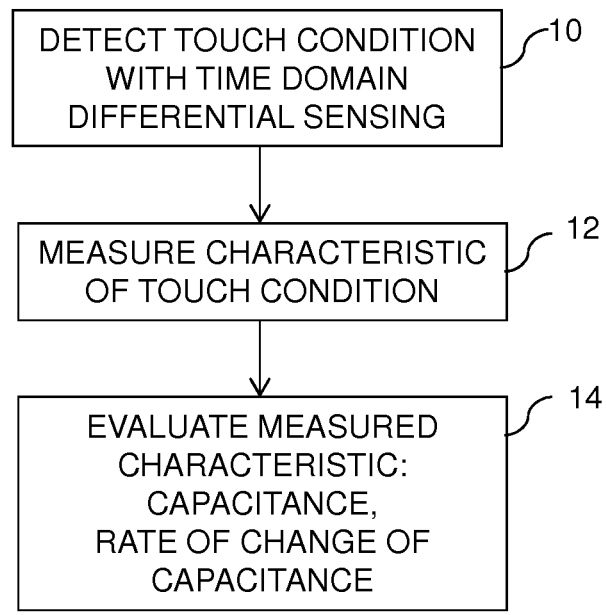
FIG. 1 is a flow chart illustrating a method for determining a stimulus in accordance with an embodiment of the present invention.

Referring now to FIG. 1, a flow chart illustrating a method in accordance with a first embodiment is provided. In general terms, a method for determining a stimulus includes a) applying time domain differential techniques to detect a touch condition, b) measuring a characteristic of the touch condition in response to the touch condition being met, and c) evaluating the measured characteristic to determine information regarding the touch stimulus.

Applying time domain differential techniques to detect a touch condition is depicted as step 10 in FIG. 1. This step generally includes measuring the rate of change of electrode capacitance as an object approaches a touch substrate. This step can be aided by determining whether the object is proximate the touch substrate before measuring for a rate of change of electrode capacitance. For example, this step can include comparing a measured electrode capacitance against a setpoint capacitance. When the measured electrode exceeds a setpoint capacitance, the rate of change of electrode capacitance is then determined. Determining the rate of change of electrode capacitance can include determining the change in capacitance over time. Where the sampling interval remains constant, this operation can include dividing the difference between successive capacitive values over the sampling interval. The measured rate of change is then compared against a threshold rate of change. If the measured rate of change falls below the threshold rate of change, the object is determined to have come to rest, or nearly come to rest, with respect to a touch substrate or over a touch substrate. If the measured rate of change then increases from zero, or nearly zero, the object is determined to have begun receding from its previous position against or over the touch substrate. A touch condition corresponds to placement of an object against a substrate in the present embodiment, being at least momentarily at rest, but can include movement of an object along a substrate in other embodiments.

Further with respect to step 10 of FIG. 1, additional time domain differential techniques are disclosed in WO2010/111362 and WO2013/163496.

Measuring a characteristic of a touch condition is depicted as step 12 in FIG. 1. This step generally includes measuring a capacitance or measuring a rate of change of capacitance. For example, in embodiments where the touch condition includes placement of an object against a substrate, the characteristic can include the capacitive output of one or more electrodes to map the individual ridges and valleys in a fingertip in accordance with known sensing techniques, for example the sensing techniques disclosed in *Advances in Biometrics: Sensors, Algorithms and Systems* by Ratha et al (Springer Science & Business Media, Copyright 2008), or U.S. Pat. No. 4,353,056 to Tsikos, the disclosures of which are hereby incorporated by reference in its entirety. The one or more electrodes can optionally include a large number of small electrodes that are smaller than the width of the ridges and valleys in order to obtain high resolution of the fingertip. Further by example, the characteristic can include the cumulative capacitance of the object, which can be used at step 14 for the detection of spoofing attempts using prosthetic fingers. Still further by example, the characteristic can include the rate of change of electrode capacitance prior to, during, and/or after the touch condition, which can also be used at step 14 for the detection of spoofing attempts using prosthetic fingers.

Evaluating the measured characteristic to determine a stimulus is depicted as step 14 in FIG. 1. This step generally includes comparing the measured characteristic to pre-existing data in computer readable memory. The pre-existing data can include a look-up table with values that may or may not correlate to the measured characteristic. For example, where the measured characteristic includes a capacitive image of the individual ridges and valleys of a fingerprint, the look-up table can include a list of biometric values corresponding to the location of individual ridges and valleys on a known fingertip. Further by example, where the measured characteristic includes the cumulative capacitance for a finger, the look-up table can include the cumulative capacitance of a known finger as determined by the fingerprint match above. In this regard, the method guards against spoofing attempts using prosthetic fingers, which typically provide a measurably different capacitive output, even if the ridges and valleys are a match. Still further by example, where the measured characteristic includes the rate of change of capacitance, the look-up table can include the rate of change of a finger as previously collected from one or more measurements. In this regard, the computer readable memory can include a database of biometric fingerprint data, where each fingerprint match is validated by either or both of the expected capacitance or the rate of change of capacitance of the user's finger, where these values are detected before, during, or after the touch condition.

To reiterate, any electrode configuration with any time domain differential measurements can be used to determine the actual touch condition. Once the touch condition has been detected, then any of the measured parameters that are available prior to, substantially coincident with, or after the touch condition can be used to characterize the touch condition, also referred to as a stimulus (stimuli data). Using this technique, the stimuli data can be used to detect if there is a touch event generated when using a gloved finger or an ungloved finger. This can be used to compare the stimuli data with previously stored data whether over a short or long term duration. Also, the stimuli data can be compared with predetermined data stored as constants and/or references.

Figure 2:
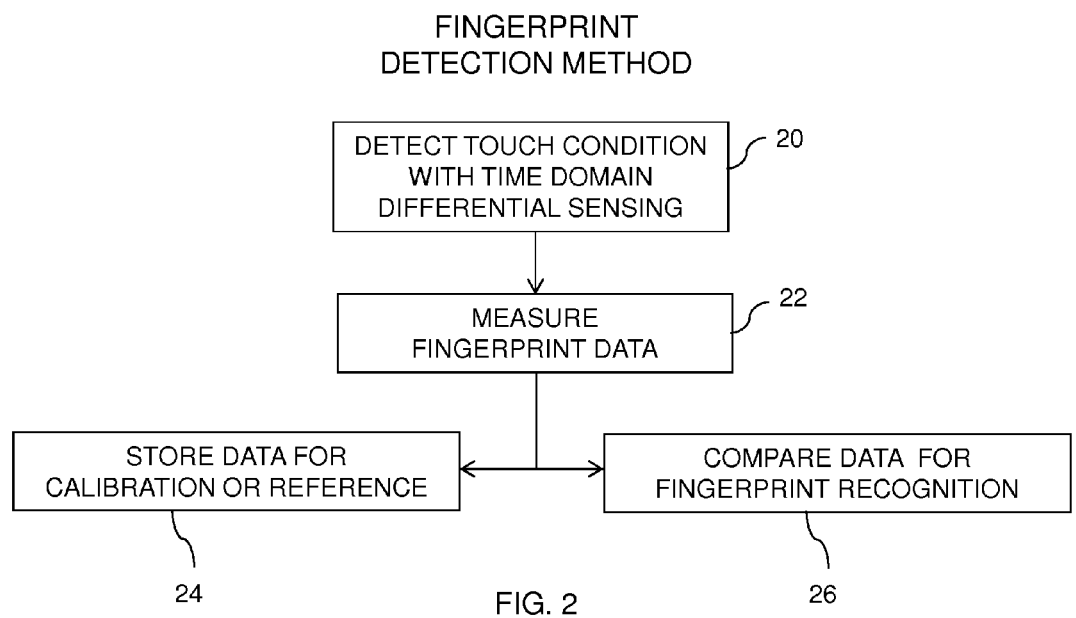
FIG. 2 is a flow chart illustrating a method for determining a fingerprint in accordance with an embodiment of the present invention.

Referring to FIG. 2, a flow chart illustrating a method in accordance with a second embodiment is provided. In general terms, the method for fingerprint recognition includes a) applying time domain differential techniques to detect a touch condition, b) measuring fingerprint data using fingerprint sensing circuitry, and $c_1$) storing the fingerprint data for calibration and reference or $c_2$) comparing the fingerprint data for proper fingerprint recognition.

Applying time domain differential techniques to detect a touch condition is depicted as step 20 in FIG. 2. This step is functionally identical to step 10 of FIG. 1. Measuring fingerprint data is depicted as step 22 in FIG. 2. This step generally includes measuring the biometric data in response to the touch condition having been detected at step 20. That is, to conserve processing resources, the method includes deferring the collection of finger biometric data until after the finger has definitively come to rest against the substrate as measured by the desired sensing circuit. Once the finger has come to rest, the same sensor or a different sensor measures fingerprint data according to techniques now known or hereinafter developed, including the techniques disclosed in Ratha et al. The fingerprint data is optionally processed for relevant biometric markers by a processor electrically coupled to the sensor performing the fingerprint measurement. Storing the fingerprint data for calibration or reference is depicted as step 24 in FIG. 2. This step generally includes storing the fingerprint data and/or the biometric markers in computer readable memory for future use. Comparing the fingerprint data is depicted as step 26 in FIG. 2. This step generally includes a comparison against biometric data previously stored to memory. The biometric data can include all or a portion of the fingerprint data, including any biometric markers that were derived in the measurement of the fingerprint at step 22.

As noted above, existing fingerprint sensing techniques can be tricked into misdiagnosing fingerprints. For example, spoofing can be accomplished by imprinting a forged fingerprint onto a carrier material that is then placed on a finger. However, time domain differential techniques can be used to detect the carrier material. By first sensing the touch condition and then evaluating the touch characteristics available prior to, during, and after the touch condition, the method of the present embodiment can determine if the touch condition is attributable to a human finger alone or if the touch condition is attributable to a carrier material on a human finger.

Figure 3:
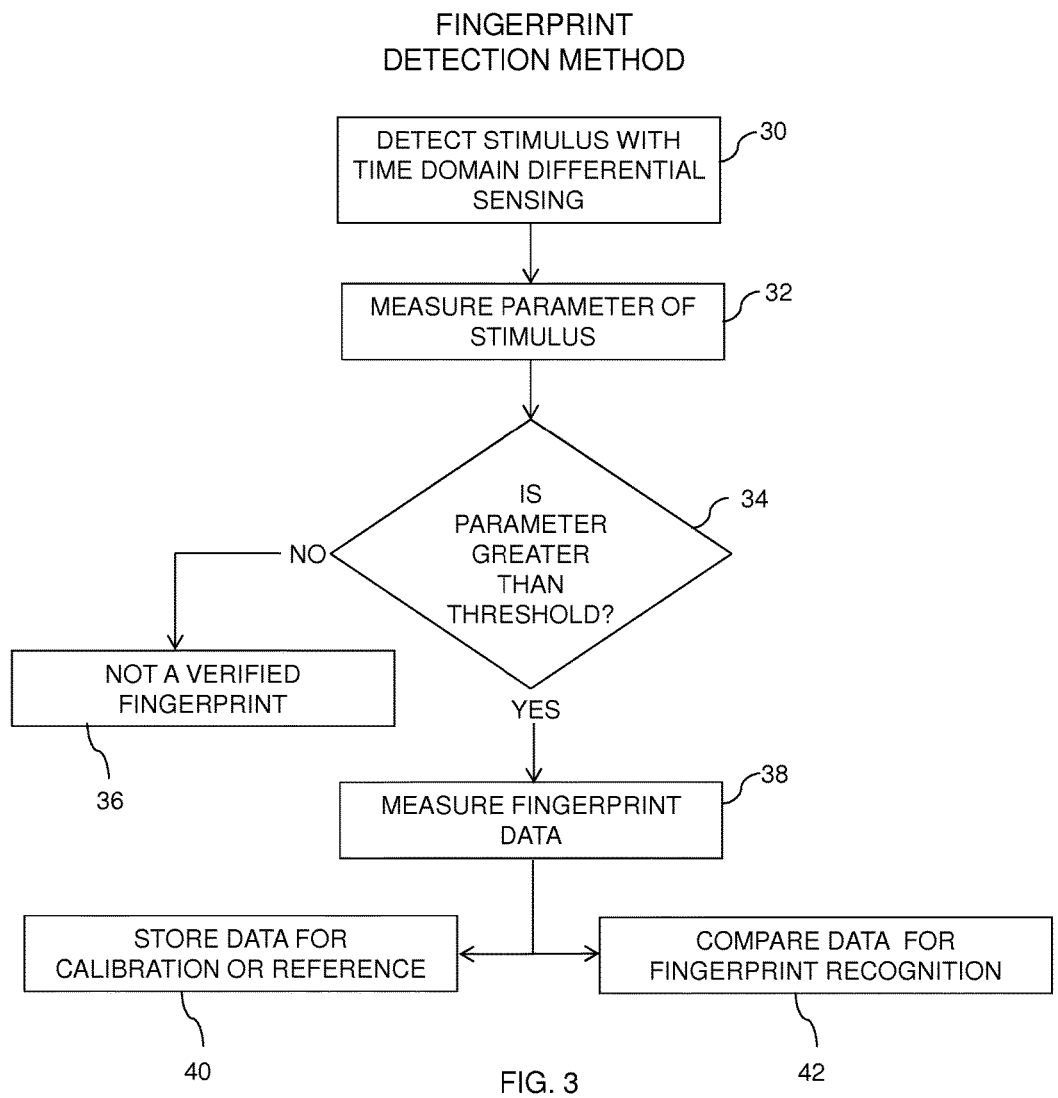
FIG. 3 is a flow chart illustrating a method for determining a stimulus in accordance with a third embodiment of the present invention.

Referring to FIG. 3, a flow chart illustrating a method in accordance with a third embodiment is provided. In general terms, a further method for fingerprint recognition includes a) applying time domain differential techniques to detect a stimulus, b) measuring a parameter of stimulus strength, c) comparing the stimulus strength to a predetermined threshold corresponding to a bare finger, d) if the stimulus strength is less than the predetermined threshold, register an invalid fingerprint, e) if the stimulus strength is greater than or equal to the predetermined threshold, measuring fingerprint data using fingerprint sensing circuitry, and $f_1$) storing the fingerprint data for calibration and reference and/or $f_2$) comparing the fingerprint data for proper fingerprint recognition.

Applying time domain differential techniques to detect a stimulus is depicted as step 30 in FIG. 3. This step is functionally identical to step 10 of FIG. 1. Measuring a parameter of stimulus strength is depicted as step 32 in FIG. 3. For example, if the stimulus is a touch condition, the parameter can include the magnitude of the capacitive signal strength corresponding to placement of an object (finger or other implement) against a touch surface. Comparing the stimulus strength to a predetermined threshold is shown as step 34 in FIG. 3. This step generally includes a comparison of the magnitude of the signal strength against a predetermined threshold that corresponds to a bare finger. This step is typically performed in digital or analog logic. If the finger were to include a carrier material, the measured magnitude is expected to be less than the predetermined threshold, because the human tissue is spaced apart from the touch substrate by a distance equal to the thickness of the carrier material. Under this scenario, the method would return an unverified fingerprint at step 36. If however the finger does not include a carrier material, the measured magnitude is expected to be greater than or equal to the predetermined threshold. Under this scenario, the method would continue to measure the fingerprint data at step 38. This step generally includes measuring fingerprint data for relevant biometric markers by a processor electrically coupled to a sensor performing the fingerprint measurement. Storing the fingerprint data for calibration or reference is depicted as step 40 in FIG. 3. This step generally includes storing the fingerprint data and/or the biometric markers in computer readable memory for future use. Comparing the fingerprint data is depicted as step 42 in FIG. 3. This step generally includes a comparison against biometric data previously stored to memory. The biometric data can include all or a portion of the fingerprint data, including any biometric markers that were derived in the measurement of the fingerprint at step 22.

As set forth above, the methods of the present invention can be performed in connection with a time domain differential sensing apparatus, including those set forth in WO2010/111362 and WO2013/163496. The time domain differential sensing apparatus generally performs at least method steps 10 in FIG. 1, 20 in FIG. 2, and 30, 32 and 34 in FIG. 3. The remaining method steps can be performed by a computer apparatus having a processor to execute a series of commands representing one or more of the remaining method steps schematically depicted in FIGS. 1-3. The computer apparatus is generally programmed with a series of instructions that, when executed, cause the processor to perform method steps as described above. The instructions that are performed by the processor are generally stored in a computer readable data storage device. The computer readable data storage device can be a portable memory device that is readable by the computer apparatus. Such portable memory devices can include a compact disk, a digital video disk, a flash drive, and any other disk readable by a disk driver embedded or externally connected to a computer, a memory stick, or any other portable storage medium whether now known or hereinafter developed. Alternatively, the machine-readable data storage device can be an embedded component of a computer such as a hard disk or a flash drive of a computer. Together, the computer and machine-readable data storage device can be a stand-alone device or embedded into a machine or a system that uses the instructions for a useful result. Additionally, any of these techniques can use light emitters, light detectors, and varying light as affected by a finger in substitution of electric field electrodes and then using time domain differential sensing processing techniques.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method comprising:
   providing a capacitive sensor having an output signal;
   detecting a placement of an object against a touch surface by calculating a rate of change of the capacitive sensor output signal, wherein detecting a placement of an object against a touch surface includes measuring a magnitude of the capacitive sensor output signal;

in response to detecting placement of the object against the touch surface, comparing the magnitude of the capacitive sensor output signal with a predetermined threshold capacitance corresponding to the capacitance of skin stored to computer readable memory to verify the object is skin lacking a carrier material; and in response to verifying the object is skin based on a determination that the magnitude of the capacitive sensor output is greater than the predetermined threshold capacitance, mapping ridges and valleys of the skin using the capacitive sensor output;

wherein the comparing the magnitude of the capacitive sensor output with the predetermined threshold capacitance corresponding to the capacitance of skin stored to the computer readable memory occurs prior to the mapping the ridges and valleys of the skin using the capacitive sensor output.

2. The method according to claim 1 further including deriving biometric fingerprint data from the mapping of ridges and valleys of the skin and storing the biometric fingerprint data for one of calibration and reference.

3. The method according to claim 1 further including deriving biometric fingerprint data from the mapping of the ridges and valleys of the skin and comparing the biometric fingerprint data with stored biometric fingerprint data for fingerprint recognition.

4. The method according to claim 1, further including returning an unverified fingerprint without acquiring biometric fingerprint data in response to determining the object includes a carrier material based on the magnitude of the output of the capacitive sensor being less than the predetermined threshold capacitance.

5. The method according to claim 1, wherein the predetermined threshold capacitance is not corresponding to ridges and valleys mapping data of the bare finger stored to the computer readable memory.

6. A method comprising:
providing a capacitive sensor, the capacitive sensor providing an output signal;

detecting the presence of a stimulus based on a rate of change of the capacitive sensor output, the stimulus including placement of an object against a touch surface;

measuring the magnitude of the capacitive sensor output;

in response to detecting placement of the object against the touch surface, without mapping ridges and valleys of the object, comparing the magnitude of the capacitive sensor output with a predetermined threshold capacitance corresponding to the capacitance of a bare finger stored to computer readable memory to verify the object is a bare finger lacking a carrier material based on a determination that the magnitude of the capacitive sensor output is greater than the predetermined threshold capacitance;

in response to verifying the object is a bare finger lacking a carrier material, measuring biometric fingerprint data from the finger using the capacitive sensor by mapping ridges and valleys of the bare finger using the capacitive sensor output; and comparing the measured biometric fingerprint data with stored biometric fingerprint data for fingerprint recognition.

7. The method according to claim 6 further including measuring the rate of change of the capacitive sensor output and validating the stimulus by comparing the rate of change of the capacitive sensor output to data stored to computer readable memory.

8. A method comprising:
providing a surface and a capacitive sensor proximate the surface, the capacitive sensor having an electrical output that varies with changes of capacitance of the capacitive sensor;

determining placement of the object against the surface based on a rate of change of the electrical output of the capacitive sensor;

measuring the magnitude of the electrical output of the capacitive sensor attributed to placement of the object into contact with the surface;

in response to detecting placement of the object against the surface, without mapping ridges and valleys of the object, comparing the magnitude of the electrical output of the capacitive sensor with a predetermined threshold capacitance corresponding to the capacitance of a bare finger stored to computer readable memory to determine the object is a bare finger and not a finger having a carrier material; and in response to determining the object is a bare finger and not a finger having a carrier material based on a determination that the magnitude of the electrical output of the capacitive sensor is greater than the predetermined threshold capacitance, measuring biometric fingerprint data corresponding to ridges and valleys of the bare finger using the capacitive sensor.

9. The method according to claim 8 further including storing the measured biometric fingerprint data for calibration or reference.

10. The method according to claim 8 further including comparing the measured biometric fingerprint data with stored biometric fingerprint data for fingerprint recognition.

11. The method according to claim 8, wherein the predetermined threshold capacitance is not based on ridges and valleys mapping data of the stored biometric fingerprint data for fingerprint recognition.

12. The method according to claim 11, further including returning an unverified fingerprint without acquiring biometric fingerprint data in response to determining the object includes a carrier material based on the magnitude of the output of the capacitive sensor being less than the predetermined threshold capacitance.

13. The method according to claim 11, wherein the predetermined threshold capacitance is not corresponding to ridges and valleys mapping data of the bare finger stored to the computer readable memory.

14. The method according to claim 11, wherein the predetermined threshold capacitance is not based on ridges and valleys mapping data of the stored biometric fingerprint data for fingerprint recognition.

* * * * *